(12) United States Patent
Antanavičius et al.

(10) Patent No.: US 12,455,492 B2
(45) Date of Patent: Oct. 28, 2025

(54) WAVELENGTH-TUNABLE SOURCE OF PULSED LASER RADIATION FOR VIS-NIR SPECTROSCOPY

(71) Applicant: UAB "EKSPLA", Vilnius (LT)

(72) Inventors: Romaldas Antanavičius, Vilnius (LT); Mikhail Grishin, Vilnius (LT); Andrejus Michailovas, Vilnius (LT)

(73) Assignee: UAB"EKSPLA", Vilnius (LT)

( * ) Notice: Subject to any disclaimer, the term of this patent is extended or adjusted under 35 U.S.C. 154(b) by 280 days.

(21) Appl. No.: 18/255,737

(22) PCT Filed: Nov. 15, 2021

(86) PCT No.: PCT/IB2021/060557
§ 371 (c)(1),
(2) Date: Jun. 2, 2023

(87) PCT Pub. No.: WO2022/118120
PCT Pub. Date: Jun. 9, 2022

(65) Prior Publication Data
US 2024/0027873 A1    Jan. 25, 2024

(30) Foreign Application Priority Data
Dec. 2, 2020 (LT) .......... 2020559

(51) Int. Cl.
*G02F 1/39* (2006.01)
*G01J 3/10* (2006.01)
(Continued)

(52) U.S. Cl.
CPC .......... *G02F 1/392* (2021.01); *G01J 3/108* (2013.01); *G02F 1/3503* (2021.01);
(Continued)

(58) Field of Classification Search
CPC .... G02F 1/3503; G02F 1/3507; G02F 1/3526; G02F 1/3551; G02F 1/392;
(Continued)

(56) References Cited

U.S. PATENT DOCUMENTS 7,970,026 B2 * 6/2011 Grishin ........... H01S 3/1103
372/18
9,099,837 B2    8/2015 Miesak
(Continued)

FOREIGN PATENT DOCUMENTS

WO    2010136761 A1    12/2010
WO    2021059003 A1    4/2021

OTHER PUBLICATIONS

G. R. Holtom et al., "High-repetition-rate femtosecond optical parametric oscillator-amplifier system near 3 mm"; JOSA B 12, 1723-1731 (1995).
(Continued)

*Primary Examiner* — Daniel Petkovsek
(74) *Attorney, Agent, or Firm* — Brown & Michaels, PC

(57) ABSTRACT

Wavelength-tunable source of pulsed laser radiation for VIS-NIR spectroscopy which consists of a pump source (1) forming bursts of picosecond pulses of high pulse repetition rate, and a synchronously pumped optical parametric oscillator (2). The pump source (1) comprises a solid-state regenerative amplifier (31) having one or two electro-optical switches (32,33) inside its resonator (44). The switches create partial transmission of the resonator for a time interval longer than a resonator roundtrip time, and eject a part of energy of a pulse circulating inside. Bursts of 5-10 ns duration are formed, which are filled with high peak power picosecond pulses. Pulse repetition rate of the order of GHz of pump pulses allows the construction of a compact optical parametric oscillator. The whole set of parameters ensures
(Continued)

high energy efficiency, stability and an ability to provide output pulse bursts repeating at up to 10 kHz repetition rate.

17 Claims, 8 Drawing Sheets

(51) Int. Cl.
| | |
|---|---|
| *G02F 1/35* | (2006.01) |
| *H01S 3/094* | (2006.01) |
| *H01S 3/1106* | (2023.01) |
| *H01S 3/16* | (2006.01) |
| *H01S 3/23* | (2006.01) |
| *G02F 1/355* | (2006.01) |

(52) U.S. Cl.
CPC .......... *G02F 1/3507* (2021.01); *G02F 1/3526* (2013.01); *H01S 3/094076* (2013.01); *H01S 3/1106* (2013.01); *H01S 3/1611* (2013.01); *H01S 3/235* (2013.01); *G02F 1/3551* (2013.01); *G02F 2203/11* (2013.01); *H01S 3/1643* (2013.01); *H01S 3/1673* (2013.01); *H01S 2302/00* (2013.01); *H01S 2303/00* (2013.01)

(58) Field of Classification Search
CPC ............. H01S 3/094076; H01S 3/1106; H01S 3/1611; H01S 3/1643; H01S 3/1673; H01S 3/235; G01J 3/108
See application file for complete search history.

(56) References Cited

U.S. PATENT DOCUMENTS

| | | |
|---|---|---|
| 9,531,151 B2 | 12/2016 | Fuchs et al. |
| 2020/0067260 A1 | 2/2020 | Barkauskas et al. |

OTHER PUBLICATIONS

H. M. van Driel, Applied Physics B 60, 411-420 (1995).
International Search Report for PCT/IB2021.060557 dated Feb. 2, 2022.
K. Wei et al., "Fiber laser pumped high power mid-infrared laser with picosecond pulse bunch output"; Optics Express 21, 25364-25372 (2013).
L.-J. He et al., "30.5-μJ, 10-kHz, picosecond optical parametric oscillator pumped synchronously and intracavity by a regenerative amplifier"; Optics Letters 43, 539-542 (2018).
P. J. Wegner and M. D. Feit, "High-power narrow-band pulses with wavelengths tunable about 1.053 mm from a synchronously pumped optical parametric oscillator"; Applied Optics 35, 890-902 (1996).
S. Cai et al., "High Conversion Efficiency, Mid-Infrared Pulses Generated via Burst-Mode Fiber Laser Pumped Optical Parametric Oscillator"; IEEE Access 8, 64725-64729 (2020).
Y. Wu et al., "Compact picosecond mid-IR PPLN OPO with controllable peak powers"; OSA Continuum 3, 2741-2748 (2020).

* cited by examiner

WAVELENGTH-TUNABLE SOURCE OF PULSED LASER RADIATION FOR VIS-NIR SPECTROSCOPY

FIELD OF THE INVENTION

The invention relates to laser sources, particularly to sources of pulsed radiation of tunable wavelength and narrow bandwidth. In particular, the invention relates to high efficiency and stability laser sources for VIS-NIR spectroscopy with a pulse repetition rate of (1-10) kHz.

INDICATION OF THE BACKGROUND ART

Visible and near-infrared (VIS-NIR) laser radiation is required in many fields of science, medicine, and industry. Spectroscopic applications (material identification, analysis of chemical composition, etc.) need radiation of tunable wavelength. One of the most important parameters in spectroscopy is a spectral resolution, which determines the narrowest spectral line that can be identified. Gas detection requires very narrowband ($<1$ $cm^{-1}$) radiation, which can only be obtained with continuous-wave or long-pulse lasers. For analysis of condensed media (liquid and solid), a spectral bandwidth of (1-10) $cm^{-1}$ is suitable. A commercial laser source must be compact, easily serviceable and reliable, as well as efficient, cost-effective and must provide output parameters necessary for the application. Another important aspect is duration of pulses. Time-resolved spectroscopy needs pulses shorter than a few tens of picoseconds. It follows that the laser source for spectroscopy should generate wavelength-tunable radiation with an optimal pulse duration, with which fast processes can be studied, but not too short for not to lose the spectral resolution. With the development of optoelectronic signal recording and processing systems, as well as opto-mechanical light beam scanning systems, there is a need for laser systems that generate wavelength-tunable pulses at high repetition rate. This allows creation of spectroscopic and analytical instruments able to perform a significantly higher number of measurements per unit time.

Optical parametric amplification devices are typical sources of wavelength-tunable radiation. Parametric generation and amplification strongly depend on parameters of the pump laser. In spectroscopic applications, which do not need high pulse energy, the most important criterion for the pump laser is a set of parameters ensuring efficient parametric conversion. Efficient conversion is required not only for the overall energy efficiency of the system, but also for stability. In the case of a very efficient interaction—the so-called gain saturation regime—energy variation of the pump laser has a weak effect on the energy of the parametrically generated radiation. Therefore, there must be a good combination of intensity of the pump radiation (pulse duration, energy, beam size) and of an interaction time.

One of the wavelength-tunable sources of pulsed laser radiation are optical parametric oscillators (OPOs) pumped by nanosecond pulses. Nanosecond lasers are among the most common and simplest lasers by design. In addition, they lead to a narrow spectral line of parametrically generated radiation. Due to simplicity, reliability and low cost they are most suitable for integration into analytical devices. However, they must meet the basic requirement—intensity of pulses they generate is sufficient for efficient optical parametric generation in a wide spectral range. For nanosecond lasers, said requirement becomes difficult to implement when pulse repetition rate increases. A reason of that is the decreasing energy (as an inverse of the pulse repetition rate) and the increasing duration of laser pulses that are generated. Thus, intensity of the pump pulses decreases which in turn degrades the efficiency and stability of the tunable laser source based on parametric interaction. In addition, the energy stability of the nanosecond laser itself deteriorates, since population inversion (excitation energy) accumulated for generation of each nanosecond pulse decreases. The parametric interaction is a nonlinear process, so the energy instability of the pump pulses results in an even greater energy instability of the parametrically generated pulses. In order to restore the deteriorating parameters of the wavelength-tunable radiation, the intensity of the pump pulses should be increased in proportion to the decreasing pulse energy. This means that, when the pulse repetition rate is increased, for example, by 10 times, the pulse duration should be reduced by 10 times as well. Such a significant reduction of the pump pulse duration, in turn, requires the OPO resonator length reduction by the same number of times so that the overall interaction length with the nonlinear crystal does not change. This approach eventually becomes impractical. Optical parametric amplification devices pumped by nanosecond lasers are also sensitive to thermal effects due to absorbed pump and parametric radiation. Moreover, nanosecond pulses from Q-switched or cavity dumped lasers possess an amplitude modulation of a temporal envelope of the pulse because of a mode-beating of longitudinal modes, and said amplitude modulation does not repeat from pulse to pulse due to resonator length fluctuations and since pulses originate from noise. High pulse repetition rate (1 kHz and higher) nanosecond laser beams have to be sharply focused to ensure efficient nonlinear interaction. The resulting temperature gradients can cause a rupture of the nonlinear crystal.

Optical parametric amplification devices also use ultrafast pump sources—mode-locked lasers. The mode-locked lasers generate continuous trains or long sequences of picosecond or femtosecond pulses. Repetition rate of the pulses within said trains or sequences is determined by a resonator length of the laser oscillator. Without an additional amplifier, the energy of the generated pulses from mode-locked laser oscillators is small: of the order of picojoules (pJ) from fiber oscillators, from a few to a few tens of nanojoules (nJ) from solid-state oscillators. Typical pulse durations of mode-locked lasers range from tens of femtoseconds to tens of picoseconds. In order to achieve a narrow spectral line—narrower than 1 $cm^{-1}$—of parametric radiation, it is optimal to use picosecond pump pulses and additional spectral narrowing means in the OPO resonator.

In OPOs with ultrashort pump pulses, the extremely short parametric interaction time can be compensated by implementing a synchronous pumping as described, for example, in H. M. van Driel, Applied Physics B 60, 411-420 (1995). Pulses of parametric and pump radiation must exactly overlap inside the nonlinear crystal. This means that the parametric pulse, after making a roundtrip in the OPO resonator, must exactly coincide with the next pulse from the pump pulse sequence. The matching of the OPO resonator roundtrip time with the pulse period in the sequence of pump pulses is ensured by adjusting the length of the OPO resonator. The pulse repetition rate of (50-200) MHz of pump pulses results in a rather long resonator from 0.75 to 6 meters. In the case of synchronous pumping with the continuous train and long sequence of picosecond pump pulses, the length of the OPO resonator must be maintained with an accuracy of a few or a few tens of micrometers. Technically, this is a difficult task with long resonators. The whole combination—the pump laser and the synchronously pumped OPO—has a considerable size and is therefore sensitive to external, thermal and mechanical impacts.

Higher pulse energy is provided by ultrafast laser oscillators operating in a Q-switched mode-locked (QSML) regime. Such oscillators emit a sequence of pulses with different amplitudes. All or a part of said sequence can be used to pump the OPO, as described by P. J. Wegner and M. D. Feit, Applied Optics 35, 890-902 (1996) and U.S. Pat. No. 9,099,837 (E. Miesak). A QSML pump laser has several disadvantages: stable operation usually requires not only a passive but also an active optical modulator; the amplitude of the picosecond pulses under the sequence envelope varies in a wide range of values, so the parametric conversion occurs only with the most intense pulses.

Picosecond pump pulses with higher energy and peak power can be obtained with the help of a laser amplifier. However, if a regenerative amplifier with a gain of $10^3$ to $10^6$ times is used, the repetition rate of the pump pulses is significantly reduced, for example, down to 1 kHz. It is impossible to construct an OPO resonator corresponding the 1 kHz repetition rate of pump pulses.

WO2010136761 (D. T. Reid et al.) describes utilization of a multi-pass mirror system, such as a Heriot cell, inside an OPO resonator to increase an optical length of the resonator up to the required length for synchronous pumping and to maintain a geometric compactness of the OPO. This allowed to use a pump pulse source with pulse repetition rate lower than usual. Examples given in said document refer to a pump pulse source with 15 MHz pulse repetition rate, which is probably a practical limit for such a solution. In the same document, a theoretical possibility of using a pump pulse source of 1 MHz pulse repetition rate was provided, i. e. the optical length of the OPO resonator is extended up to 150 meters in the multi-pass mirror system, however most probably the loss of the mirrors would exceed the parametric gain.

Yet another solution is a parametric oscillator-amplifier (OPO-OPA) scheme: pulses of high repetition rate—from 50 MHz to 200 MHz—from a laser oscillator pump an OPO and generate weak pulses of signal wave, which are then amplified by a single-pass or double-pass OPA. Pulses of lower repetition rate—1 kHz—from a regenerative amplifier are used to pump the optical parametric amplifier. To ensure passive synchronization, the regenerative amplifier is seeded by pulses from the same laser oscillator. See, e. g., G. R. Holtom et al., JOSA B 12, 1723-1731 (1995). A regenerative amplifier is absent. The beginning of a sequence of pulses from the QSML laser pumps the OPO, while the end of said sequence pumps the OPA.

L.-J. He et al., Optics Letters 43, 539-542 (2018) describes a high-energy optical parametric amplification laser system consisting of a Nd:YVO$_4$ mode-locked laser, a Nd:YAG regenerative amplifier, and an OPO. The regenerative amplifier and the OPO have a common resonator section. A KTA nonlinear crystal is placed in said common resonator section, therefore a pulse circulating in the resonator of the regenerative amplifier travels through the nonlinear crystal. A resonator length of the regenerative amplifier is calculated for a 1064 nm wavelength, and that of the OPO resonator—for a 1.5 µm wavelength (signal wave) so that sizes of fundamental transverse modes for both wavelengths are the same. There is a Pockels cell and a quarter-wave plate for the 1064 nm wavelength inside the regenerative amplifier. Together they act as a pulse picker to reduce pulse repetition rate of radiation incident from the laser oscillator. Only pulses repeating at 10 kHz repetition rate (from initial 76 MHz) are selected and trapped inside the resonator of the regenerative amplifier. At the beginning, energy of pulses of 1064 nm wavelength grows, but pretty soon the peak power of pulses at 1064 nm reaches a value, at which nonlinear conversion to parametric radiation begins. When the parametric conversion occurs, 1064 nm radiation energy growth slows down (the converted portion of energy contributes to the regenerative amplifier resonator loss). Mirrors forming the OPO resonator have high reflectivity coefficients for the signal wave, thus the output pulse of 1.5 µm wavelength is emitted by actively dumping the resonator. There is another Pockels cell inside the OPO resonator, to which, at a proper moment, a quarter-wave voltage for 1.5 µm wavelength is applied. After two passes, the polarization of the radiation is rotated by 90 degrees, and radiation exits the resonator through the polarizer. One pulse per cycle is emitted from the OPO resonator when highest energy is achieved. A train of pulses of 10 kHz pulse repetition rate is produced at the output. Energy of 7 ps-width pulses is 30 µJ, and a bandwidth is about 4 cm$^{-1}$. Approximately 4 MW peak power is achieved, and a pump-to-signal conversion efficiency—18%. However, efficient generation of multiple wavelengths or continuous wavelength tuning is not intended by this prior art solution. Furthermore, said solution cannot provide a method for generating wavelengths in the visible spectral region. The insertion of a nonlinear crystal inside the resonator of the regenerative amplifier causes a fast build-up of the internal radiation of the OPO, but the 1.5 µm radiation growth has a rather sharp evolutionary peak, indicating sensitivity to parameter changes and that back-conversion to the pump wave begins soon. The common resonator section allowed to reduce the size of the laser system, but only to a very small extent. A fairly standard length (optical length of 1.5 m) has been chosen, so the whole system is not compact and is sensitive to external factors. In general, solutions of coupled resonators are more complex than solutions of individual resonators because the operation of the pump source cannot be monitored independently.

The closest prior art are solutions that use separate modules, and the source of picosecond pump pulses has a stage of forming bursts of pulses with an extremely high pulse repetition rate. A short resonator of the synchronously pumped OPO can be realized with pump pulses having pulse repetition rate higher than 200 MHz.

K. Wei et al., Optics Express 21, 25364-25372 (2013) describes a compact optical parametric amplification laser system consisting of a fiber source of pump pulses and a short OPO, operating in the mid-infrared (abbrev. Mid-IR) region of the spectrum. A geometrical length of the optical parametric oscillator is only 12 cm, because the pump pulse source generates bursts of picosecond pulses of ultra-high repetition rate. The source of pump pulses comprises a fiber laser oscillator and stages for forming and amplifying bursts of pulses. The fiber laser oscillator generates a continuous train of picosecond seed pulses at a repetition rate of 2.72 MHz. The stage of forming the bursts of pulses comprises three fiber loops, the lengths of which are tied as follows: the second loop is 2 times shorter than the first one, and the third loop is 2 times shorter than the second one. A burst of 13 pulses is formed from each oscillator pulse; pulses inside the burst repeat at a second repetition rate of about 800 MHz, which is determined by the length of the shortest fiber loop. After forming the bursts, they are further amplified in two fiber amplification stages (total amplification factor equals to 1800). The above-mentioned method of forming pulse bursts does not have much freedom to form a desired burst profile. Moreover, due to inaccurate lengths of the fiber loops some pulses split into two pulses and periods between pulses are not identical. Thus, the burst of pump pulses is not optimized for synchronous pumping of OPOs. Using a long (50 mm) periodically poled magnesium-oxide doped lithium niobate crystal (MgO:PPLN) and with 24 kW peak power of the pump radiation, 1.4 kW peak power at 3.45 μm wavelength was obtained. The conversion efficiency from pump radiation (1.067 μm) to the idler wave (3.45 μm) did not exceed 10%. This corresponds to energy of bursts of output pulses not higher than 1.5 μJ and maximum 75 nJ energy of individual pulses. Increasing the pump power to the highest attainable value did not result in an increase in the power of the parametrically generated radiation. One of the reasons of that is heating of the nonlinear crystal, which changes the parameters of the crystal and can cause crystal rupture. The second reason is the aforementioned not optimized profile and period of pulses inside bursts. Another undesirable consequence of crystal heating, which occurs already at moderate pump powers, when the efficiency has not yet dropped, is an increase in the spectral width of the parametrically generated radiation. Finally, the OPO of said solution operated stably only when both of its resonator mirrors were highly reflective for signal wave. In this case, all the energy of the signal wave circulates inside, which improves the conditions for parametric amplification. In order to have both idler and signal waves at the output, the resonator output mirror should be partially transmissive for the signal wave. However, stable operation was not achieved when the reflectance of the output mirror was reduced to 78%. Thus, said solution is not adapted to generate multiple-wavelength or wavelength-tunable radiation. The disadvantage associated with the formation of pulse bursts can be remedied by the method described in a patent application no. PCT/IB2019/058167, in which a burst of pulses of any desired length, identical pulse period and of a controlled profile can be formed. Further, U.S. Pat. No. 9,531,151 (D. Fuchs et al.) describes a method for forming bursts of a few pulses using a regenerative amplifier. The electro-optical switch of the amplifier used to change polarization of the circulating pulse, is driven by a voltage that has several values. According to the first embodiment, a burst of three pulses of equal amplitudes is ejected from the regenerative amplifier. This is accomplished as follows: when the pulse energy circulating inside the regenerative amplifier reaches a maximum, voltage of the electro-optical switch is reduced to a value less than a quarter-wave voltage $U_{\lambda/4}$ but greater than 0V. The voltage is then steadily reduced to 0V. According to the second embodiment, a burst of four pulses of different amplitudes is ejected from the regenerative amplifier. This is achieved by selecting another voltage profile: voltage is reduced to said intermediate value before the energy of the pulse circulating inside the amplifier reaches its highest value, then a constant voltage is kept for a certain time interval, and then switched off. Another disadvantage of K. Wei et al. solution is low conversion efficiency, which is less than 10% although the nonlinear crystal of quasi-phase-matching was used. On the other hand, not all the power of the pump radiation was exploited since the nonlinear crystal began to heat up and its parameters changed.

S. Cai et al., IEEE Access 8, 64725-64729 (2020) describes another compact Mid-IR optical parametric amplification laser system consisting of the fiber source of pump pulses and the short OPO. A 1.1 GHz repetition rate of pump pulses allowed for using of an extremely short (60 mm) OPO resonator with a 50 mm-long MgO:PPLN nonlinear crystal inside. Pump pulses are supplied by pulse bursts lasting 220 ns and repeating at 100 kHz. The GHz pulse repetition rate is formed by multiplying an initial 138 MHz repetition rate of the oscillator by 8 times with the help of 50/50 fiber splitters and couplers and fiber delay lines. The bursts are then formed by a modulator. Almost 20% conversion efficiency from 1.06 μm to 3.8 μm radiation (idler wave) was demonstrated. High efficiency is associated with the steep front edge of the pump pulse burst. However, although the energy of a single pump pulse was in the order of μJ (while the peak power was 10 kW), 80 pump pulses were needed for the energy of the converted-wavelength radiation to build up, and only then stable operation was achieved. ~1 kW peak power of idler wave radiation and 0.1 μJ energy per pulse were obtained, while the bandwidth was ~7 $cm^{-1}$. The OPO resonator mirrors were high-reflective for the signal wave and high-transmissive for the idler wave, i. e. the resonator was optimized to generate a single wavelength. In order to have both idler and signal waves at the output, the resonator output mirror should be partially transmissive for the signal wave. This would reduce the proportion of signal wave energy circulating inside the resonator and worsen the parametric gain conditions. In summary, said solution is not adapted to generate multiple wavelengths or wavelength-tunable radiation.

Similar solutions are also described in other articles. For example, Y. Wu et al., OSA Continuum 3, 2741-2748 (2020) describes a wavelength-tunable system with an ability to control peak power. The mid-IR parametric amplification laser system consists of a hybrid pump pulse source and the compact OPO. Bursts of pump pulses are generated as follows: a laser diode operating at 1.5 GHz pulse repetition rate is used, then an electro-optical modulator (1 MHz) forms the bursts and three ytterbium-doped fiber amplifiers amplify the radiation. Due to the high repetition rate of pulses from the oscillator, there was no need to increase it. A 40 mm-long PPLN nonlinear crystal was placed inside a two-mirror OPO resonator. A 15 cm geometrical length of the oscillator met a condition of sub-harmonic synchronous pumping, i. e. the resonator was twice as long as defined by the period of pump pulses. As a result, two pulses of signal wave travel simultaneously in the OPO resonator. The nonlinear crystal is placed in the middle of the resonator, therefore every pump pulse overlaps with both—signal wave pulse traveling forwards and signal wave pulse traveling backwards. The overlapping of two signal pulses undoubtedly improves the conditions of the nonlinear process and accelerates the development of parametric radiation. Another reason for the fast evolution of parametric radiation is the steep front edge (as far as the electro-optical modulator allowed) of the bursts pumping the OPO. The highest peak power of 1.2 kW was achieved with the highest (90 kW) peak power of pump pulses when the bursts of pump pulses were 25 ns long. The conversion efficiency from pump (1.04 μm) radiation to idler wave was 20%. When the duration of pump bursts was increased, the peak power of the pump pulses decreased, and therefore the peak power of the parametric radiation decreased, and the conversion efficiency remained similar. The PPLN nonlinear crystal had five regions with different poling periods, which allowed the generation of five narrow (of about 1 $cm^{-1}$ in width) spectral lines in the idler wave tuning range from 2260 nm to 3573 nm. However, the discrete poling regions of the nonlinear crystal did not allow continuous wavelength tuning, and the output of the signal wave radiation from the resonator was not intended.

It is optimal to use BBO nonlinear crystals to obtain wavelength-tunable radiation in the VIS-NIR spectral region, and to pump them with a second, third or fourth harmonic from the fundamental wavelength of 1 μm lasers. Nd-ion doped solid-state amplifiers are best suited to achieve a narrow spectral line and high energy of pump radiation. High energy and peak power of pump radiation ensure good conversion in the harmonic module and, later, in the optical parametric oscillator.

In summary, the discussed solutions show that systems (with quantum or parametric amplifiers) generating microjoule-level energy and >10 kW peak power picosecond pulses of wavelength-tunable radiation are not compact. In other solutions (without quantum or parametric amplifiers), the systems are more compact, but energies of individual output pulses are less than 1 μJ and the peak power is <10 kW. Furthermore, solutions, where pump sources are weak, usually require nonlinear crystals of quasi-phase matching (periodically poled), which are expensive and have a low damage threshold. None of the solutions mentioned above can offer a wavelength-tunable laser source for VIS-NIR spectroscopy featuring high efficiency and stability and operating at (1-10) kHz pulse repetition rate.

The aim of this invention is to provide a laser for VIS-NIR spectroscopy, which meets the following requirements:
  is compact, stable and easily serviceable;
  wavelength of output radiation is continuously tunable over a wide range of visible and/or near-infrared spectral range;
  repetition rate is not less than 0.5 kHz, preferably—not less than 2 kHz, in the most desired mode—not less than 10 kHz; or is controlled according to the needs in the (0.5-10) kHz range;
  a bandwidth of output radiation does not exceed 10 cm$^{-1}$, preferably—does not exceed 8 cm$^{-1}$, in the most desired mode—does not exceed 3 cm$^{-1}$ in the entire tuning range;
  conversion efficiency from pump radiation to parametric radiation is at least 10% in the entire tuning range;
  energy of each burst of pump pulses is at least 5 μJ, while energy of single pulses—of the order of 1 μJ in the entire tuning range;
  peak power of output radiation is in the (10-100) kW range with the possibility to reduce, if necessary;
  fast tuning of the wavelength;
  high quality of the laser beam.

SUMMARY OF THE INVENTION

According to this invention, a wavelength-tunable source of pulsed laser radiation for VIS-NIR spectroscopy comprising a pump pulse source and an optical parametric oscillator, wherein said pump pulse source comprises:
  a laser oscillator generating a continuous train of picosecond seed pulses, defined by a first repetition rate $f_1$ in the range from 10 kHz to 100 MHz; and
  a module for pulse bursts formation and amplification which provides a sequence of bursts of pump pulses, wherein each said burst of pump pulses consists of picosecond pump pulses repeating at a second repetition rate $f_2$ which is higher than said first repetition rate $f_1$ and is in the range from 200 MHz to 2 GHz; a time interval between adjacent bursts of pump pulses corresponds to a third repetition rate $f_3$ which is lower than the second repetition rate $f_2$ and lower than or equal to the first repetition rate $f_1$;
  said optical parametric oscillator comprises: at least one optical parametric amplification nonlinear crystal, placed inside an optical resonator, wherein two photons of lower energy are generated from one photon of radiation of pump wavelength $\lambda_P$: a signal wave photon of wavelength $\lambda_S$ and an idler wave photon of wavelength $\lambda_I$; and
  at least two mirrors which form said optical resonator of a length $L_2$;
  the pump pulse source and the optical parametric oscillator are mutually matched so that a roundtrip time of the resonator of the optical parametric oscillator is equal to a time interval $1/f_2$ between adjacent pump pulses; the optical parametric oscillator provides a sequence of bursts of output pulses, wherein each said burst of output pulses consists of picosecond pulses of signal and/or idler wave, wherein
  said module for pulse bursts formation and amplification comprises a solid-state regenerative amplifier having one or two optical switches inside its resonator;
wherein
  said optical switches are configured so that, by applying a voltage to both or one of the optical switches, seed pulses spaced apart by a time interval $1/f_3$, are trapped inside the resonator; the accuracy of a moment $t_0$ when the voltage is turned on ensures at least 1% energy stability of the output pulses;
  by turning off of the voltage on one of the optical switches or reducing the voltage on both or one of the optical switches at a time moment $t_1$, a partial transmittance of the resonator is created for a time interval $\Delta t$ which is longer than a roundtrip time of the resonator, and a part of energy of a pulse circulating inside the resonator is coupled out;
  duration of the bursts of pump pulses is equal to said time interval $\Delta t$;
  said third repetition rate $f_3$ is in the range from 500 Hz to 10 kHz;
  each burst of pump pulses contains from 7 to 15 consecutive pump pulses with a peak power exceeding 800 kW, while a sum energy of each burst of pump pulses is not less than 300 μJ;
  a bandwidth of the pump pulses does not exceed 1 cm$^{-1}$, while a duration is from 15 ps to 70 ps;
  for the pump wavelength $\lambda_P$, a phase-matching condition for optical parametric amplification in said nonlinear crystal is satisfied over the entire transparency range of the nonlinear crystal;
  conversion efficiency from the sequence of bursts of pump pulses to the sequence of bursts of output pulses is at least 10% in an entire wavelength tuning range;
  each burst of output pulses has from 5 to 10 consecutive output pulses with a peak power exceeding 10 kW in the entire wavelength tuning range;
  a bandwidth of the output radiation does not exceed 10 cm$^{-1}$;
  when pumped with near-infrared laser radiation or its harmonics, the wavelength tuning range of the output radiation covers the visible and near-infrared spectral regions.

The resonator of said regenerative amplifier has one electro-optical switch controlled by a two-level voltage signal $U_3(t)$.

The time moment $t_1$ when a partial transmittance of the resonator of said regenerative amplifier is created is when energy of the pulse circulating inside the resonator reaches the level of 1 μJ.

The module for pulse bursts formation and amplification also comprises a solid-state linear amplifier; an overall gain of the regenerative amplifier and the linear amplifier is not less than $10^4$.

The laser oscillator is a solid-state Nd:YVO$_4$ or Nd:YAG mode-locked oscillator generating (1-10) nJ energy picosecond pulses at the repetition rate $f_1$ equal to 80 MHz; the regenerative amplifier is a regenerative amplifier of Nd:YVO$_4$ or Nd:YAG medium, which forms pulse bursts with energy exceeding 20 μJ, when the repetition rate $f_3$ of the bursts is equal to 10 kHz; and the linear amplifier is a single-pass or a double-pass amplifier of Nd:YVO$_4$ or Nd:YAG medium, at an output of which energy of pulse bursts exceeds 1 mJ at $f_3$ equal to 10 kHz.

A pair of the wavelengths $\lambda_S$, $\lambda_I$ generated during the parametric interaction is changed by: 1) rotating said at least one optical parametric amplification nonlinear crystal with respect to its optical axis, 2) changing a temperature of the nonlinear crystal, or 3) changing a transmission or reflection wavelength of a spectrally selective element.

The pump radiation beam propagates collinearly to the resonator axis of the optical parametric oscillator; said at least one optical parametric amplification nonlinear crystal is a pair of crystals selected from BBO, BIBO, LBO, KTA, KTP, MgO:LiNbO$_3$, ZnO:LiNbO$_3$ or other nonlinear crystals transparent in the VIS-NIR region; the wavelength tuning is performed by symmetrically rotating both crystals of said pair of crystal in opposite directions with respect to the optical axes of the crystals and/or by changing the temperature of the crystals.

The wavelength of pump radiation is in the range from 250 nm to 1340 nm.

The wavelength tuning range of the output radiation is from 395 nm to 2600 nm or from 1350 nm to 5000 nm.

The bandwidth of the output radiation does not exceed 3 cm$^{-1}$.

A full width at half maximum amplitude level of the bursts of pump pulses is in the (5-10) ns range, and the amplitude of the pump pulses with a peak power exceeding 800 kW differs by no more than 20%.

One mirror of said at least two mirrors forming the optical resonator is partially transmissive for the wavelength $\lambda_S$ of signal wave and highly transmissive for the wavelength $\lambda_I$ of idler wave.

Said matching of the roundtrip time of the resonator of the optical parametric oscillator with the time interval $1/f_2$ between adjacent pump pulses is performed by adjusting the length $L_2$ of the resonator or the length $L_1$ of the resonator of the regenerative amplifier.

During rotation of the at least one optical parametric nonlinear crystal relative to its optical axis or its temperature change for wavelength tuning, the length $L_2$ of the optical parametric oscillator resonator is adjusted; the length adjustment is performed according to the highest value of the average power of the output radiation.

Advantages of the Invention

The wavelength-tunable laser source of this invention has higher conversion efficiency compared to optical parametric devices that use nanosecond pulses for pumping. On the other hand, due to the higher peak power of the pump pulses, it is possible to have the same efficiency of parametric interaction, but to operate in a safer mode and/or to achieve a higher repetition rate. Compared to optical parametric devices that use ultrashort pulses for pumping, the laser source of this invention is more compact. The pulse repetition rate of the order of GHz results in a small size of the OPO: geometrical length of the OPO resonator equals to a few tens of centimeters. Thus, requirements for the length stability are significantly relaxed. Resonator elongation of 1 mm can be tolerated. The whole combination—the pump laser and the synchronously pumped OPO—is also rather compact, since the resonator of the regenerative amplifier is also short. A footprint of the whole laser system is very important for integration into analytical instruments.

High pump pulse energies are achieved because radiation amplification is done in solid-state laser amplifiers. Firstly, it allows to use a harmonic module that extends the limits of the tuning range to the visible spectral range. Secondly, conventional bulk nonlinear crystals can be used in the OPO resonator. Bursts of pump pulses containing at least 7 consecutive pulses with a peak power exceeding 500 kW, preferably >800 kW, can be formed. High peak power of pump pulses not only provides microjoule-level energy of individual pulses of the parametrically generated radiation over a wide tuning range, but also is the means to ensure high efficiency and stability of the parametric interaction.

Further, pumping by bursts of pulses gives a good ratio of average and peak powers, allowing nonlinear crystals to operate at higher pulse repetition rates without damage. Increasing the repetition rate by the means of forming pulse bursts improves the overall energy efficiency of the system. A shape of the bursts that pump the OPO can be varied: it is controlled by selecting the beginning time, duration and level of the partial transmission of the regenerative amplifier. It is possible to achieve that a profile of the burst is similar to a rectangular nanosecond pulse and the amplitude variation of the most intense pulses does not exceed 20%. Due to the method of burst formation used in this invention, unpredictable (extremely dangerous for the nonlinear crystal) pulse amplitude fluctuations do not occur even with changes in the resonator length of the regenerative amplifier. The steep front edge of the bursts of pump pulses results in a low generation threshold and fast growth of parametric radiation.

By using narrowband active media in the oscillator and amplifiers and/or spectral narrowing means in the optical parametric oscillator ensures a narrow spectral line. Pumping the optical parametric oscillator with narrowband (of a few inverse centimeters) picosecond radiation gives less than 10 cm$^{-1}$ bandwidth of the generated wavelength-tunable radiation in the entire tuning range. The using of bulk crystals or their pairs ensures durability, continuous angular or temperature wavelength-tuning, high output beam quality and lower cost of the system.

DETAILED DESCRIPTION OF THE PREFERRED EMBODIMENTS

Figure 1A:
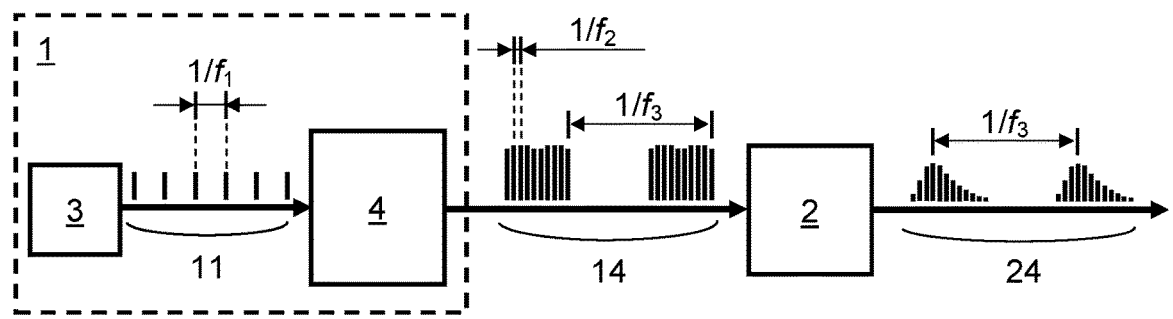
FIG. 1A-1B—block diagrams illustrating essential features of the laser source of this invention.
Figure 1B:
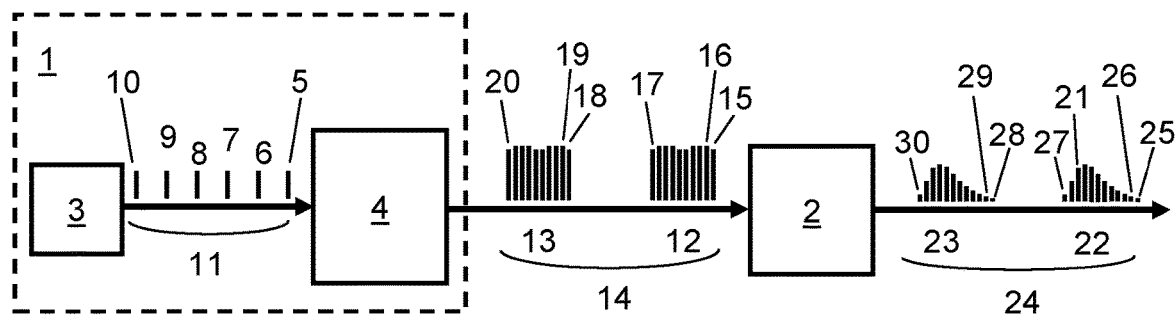

FIG. 1A-1B block diagrams illustrate essential features of the laser source of this invention. The source consists of a pump pulse source 1 and a synchronously pumped optical parametric oscillator (OPO) 2. The pump pulse source 1 comprises a laser oscillator 3 and a pulse bursts formation and amplification module 4. The laser oscillator 3 generates a continuous train 11 of picosecond seed pulses 5-10. Pulse repetition rate $f_1$ within said train 11 of seed pulses is in the range from 10 kHz to 100 MHz. The pump pulse source 1 generates a sequence 14 of pump pulse bursts 12, 13. Each burst 12, 13 of pump pulses consists of picosecond pulses 15-17, 18-20. Pulses within the bursts repeat at ultra-high repetition rate $f_2$ in the range from 200 MHz to 2 GHz, while repetition rate $f_3$ of bursts 12, 13 is in the range from 500 MHz to 10 GHz. Duration of bursts 12, 13 is from 5 ns to 10 ns (full width at half-maximum), and there are at least five consecutive pump pulses with energy exceeding 10 µJ. Sum energy of each pump pulse burst 12, 13 is not less than 300 µJ.

The optical parametric oscillator 2 comprises at least two mirrors, which form an optical resonator, with one or more nonlinear crystals placed inside. The nonlinear crystals feature optical parametric amplification nonlinearity, and two photons of lower energy are generated from a single photon of pump radiation of wavelength $\lambda_P$: a signal wave photon of wavelength $\lambda_S$ and an idler wave photon of wavelength $\lambda_I$. There are several possible implementations of the optical parametric oscillator 2:

- a length of the resonator is equal to an integer number of wavelengths $\lambda_S$ of the signal wave (it is referred to as a resonance condition for the signal wave is satisfied), and one of the mirrors has partial transmission for the signal wave and partial or high-transmission for the idler wave;
- the length of the resonator is equal to an integer number of wavelengths $\lambda_I$ of the idler wave (it is referred to as a resonance condition for the idler wave is satisfied), and one of the mirrors has partial transmission for the idler wave and partial or high-transmission for the signal wave;
- the length of the resonator is a multiple of both $\lambda_S$ and $\lambda_I$, and the mirrors are partially transmissive for both or one of the waves.

A roundtrip time of the OPO resonator is equal to the time interval $1/f_2$ between adjacent pump pulses 15, 16, thus ensuring the condition of synchronous pumping. Since there is no seed radiation, the first pulses 15 and 18 of each pump pulse burst 12, 13, respectively, amplify only quantum noise, i. e. spontaneous parametric fluorescence occurs. The part of the signal or idler wave radiation generated during the parametric amplification that is reflected back to the resonator and for which the resonance condition is satisfied becomes a seed radiation at the next resonator roundtrip when the next pump pulse enters the nonlinear crystal of the OPO. Pump pulses after one or two passes through the nonlinear crystal are ejected from the OPO resonator.

Initially, an efficiency of power conversion from pump radiation to signal and idler wave radiation is low. Later, an exponential growth of power begins. When the pump pulse burst ends, the parametric amplification no longer occurs at the next resonator roundtrip, but a portion of the internally circulating pulse still leaves the OPO 2 resonator. Therefore, an output pulse 21 of the signal or idler wave generated by the last pump pulse 17 of the pump pulse burst 12 is not the last pulse of the output pulse burst 22.

A sequence of output pulse bursts 22, 23 exits the optical parametric oscillator 2, where each output pulse burst 22, 23 consists of picosecond signal and/or idler wave pulses 25-27 and 28-30, respectively. A duration of the output pulse bursts 22, 23 is from 3 ns to 8 ns (full width at half maximum).

An essential feature of the source of the present invention is the high-energy burst of pump pulses of nanosecond duration filled with picosecond pulses. The picosecond duration of the pump pulse results in a high peak power, which significantly increases the strength of the nonlinear interaction. Thus, a nanosecond-width burst of pump pulses composed of picosecond pulses results in higher power conversion efficiency when compared to an OPO pumped by a nanosecond pulse of the same duration and energy.

Another feature of the source of the present invention is that the nanosecond burst of pump pulses is composed of pulses with similar amplitudes. This enables to achieve the efficiency of parametric interaction as high as possible without exceeding the damage threshold of the OPO components. In a preferable embodiment of the present invention, $f_3$ is equal to 10 kHz, and the pump pulse bursts 12, 13 contain from 5 to 15 consecutive pulses with a peak power exceeding 800 kW and amplitude variation not higher than 20%.

The laser oscillator 3 can be selected from a large number of low energy—of the order of picojoules or nanojoules—pulsed laser sources present on the market. These can be high-pulse-repetition-rate and low energy fiber or solid-state mode-locked lasers or laser diodes. Pulse energy of the pulses generated by typical fiber oscillators is at µJ level, and the pulse repetition rate is the range from several tens of MHz to several GHz. Pulse energies of free space solid-state laser oscillators such as Nd:YVO$_4$, Nd:YAG, Nd:YAP, Nd:KGW, etc. or broadband Yb:YAG, Yb:KGW, Yb:CALGO typically exceed 1 nJ. The pulse repetition rate of standard solid-state laser oscillators is in the order of several tens of MHz. (80-100) MHz is a typical pulse repetition rate of commercial solid-state mode-locked lasers which generate a continuous train of pulses of stable amplitude. According to one of embodiments of the present invention, the repetition rate $f_1$ of pulses in the pulse train 11 is equal to 80 MHz, and the energy of each pulse 5-10 is about 15 nJ. The width of the spectrum of pulses generated by the oscillator of such parameters is approximately 0.1 nm at 1064 nm wavelength, or –~1 cm$^{-1}$. Possible laser oscillators that could also be used as the laser oscillator 3 for the source of the present invention are semiconductor laser diodes emitting narrowband radiation and with a wide range of pulse repetition rates—from several hundred Hz to several hundred MHz.

Characteristics of pump radiation for the OPO are formed in the module 4, which performs the function of forming and amplifying pulse bursts. If necessary, generation of harmonics is also performed. Module 4 may include a pulse picking device which reduces pulse repetition rate of the oscillator down to $f_3$ (selects pulses 5 and 10 from the train 11 which will further be amplified and from which pulse bursts 12 and 13 will be formed). There are several ways to form bursts of high pulse repetition rate. In the source of the present invention, a solid-state regenerative amplifier is used to form bursts of high energy and with duration of (5-10) ns.

In general, a wavelength of the pump radiation is from 250 nm to 1340 nm. When near-infrared laser radiation or its harmonics are used for pumping, and transparent in VIS-NIR nonlinear crystals (BBO, BIBO, LBO, KTA, KTP, MgO:LiNbO$_3$, ZnO:LiNbO$_3$) are employed, the wavelength tuning range of the source of the present invention covers visible and near-infrared spectral range from 395 nm to 5000 nm. A continuous tuning range can be from 395 nm to 2600 nm, from 600 nm to 4000 nm or from 1350 nm to 5000 nm.

Figure 2:
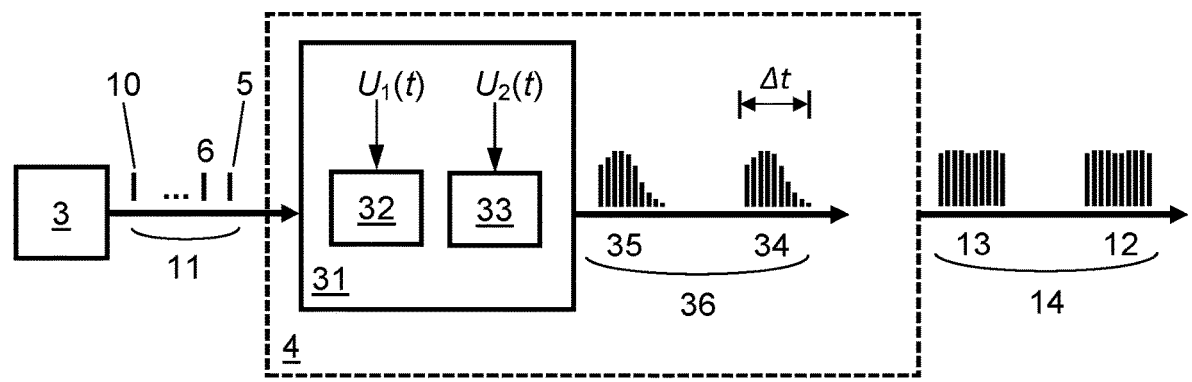
FIG. 2—principal scheme of a pulse bursts formation and amplification module of this invention.

FIG. 2 illustrates an idea of forming pulse bursts with a regenerative amplifier. The module 4 comprises a regenerative amplifier 31 with one or two optical switches 32, 33 in the resonator, which together act as a valve to inject a pulse from the oscillator and to maintain resonator closed (high resonator quality) for the intended number of resonator roundtrips for regenerative amplification. Said optical switches 32, 33 also execute a resonator dumping during a time interval Δt which is longer than the resonator roundtrip time. During the time interval Δt, the resonator is partially transmissive—only a part of the energy of the pulse circulating in the resonator is ejected during one roundtrip, and thus bursts 34, 35 of pulses are formed (sequence 36). Finally, the optical switches 32, 33 open the resonator completely (low resonator quality).

The optical switches 32, 33 are electro-optical switches (Pockels cells), driven by voltage signals $U_1(t)$ and $U_2(t)$, respectively, control the quality of the resonator and the dumping level through a polarizer placed in the resonator. The initial state of the resonator is when the resonator is completely closed (no voltage on the electro-optical switches is applied). Neither generation nor amplification occurs due to high losses caused by the quarter-wave plate. As soon as the seed pulse 5 from the oscillator enters the resonator of the regenerative amplifier, a voltage is applied to the electro-optical switches to compensate for the effect of the waveplates and to minimize losses. The amplification of the pulse trapped in the resonator begins. The pulse passes many times through an active medium and is amplified from $10^2$ to $10^4$ times during the closed resonator stage. After some number of resonator roundtrips, voltage on the electro-optical switches is reduced for the time interval Δt. In this way, a part of the amplified pulse is ejected from the resonator and the rest is further amplified. The moment at which the resonator is partially opened, is selected depending on a desired temporal profile of the pulse bursts 34, 35. The pulse repetition rate $f_2$ of the pulses ejected from the resonator is inversely proportional to the resonator roundtrip time. After the time interval Δt, the resonator is fully opened in order to completely dump it.

The regenerative amplifier 31 operating in this mode performs both amplification and burst forming functions. And this is one of the distinctive features of the present invention. By controlling the dumping level and duration of the regenerative amplifier 31, the aim is to form such a temporal profile of the bursts 34, 35 that pump pulse bursts 12, 13 at the output of the whole module 4 have amplitude variation of the most intense pulses not exceeding 20%. The module 4 may have additional amplification stages. The small resonator length of the regenerative amplifier results in a short roundtrip time, which determines the pulse repetition rate $f_2$ inside the bursts 34, 35. A resonator of about 30 cm is required to obtain 500 MHz, and a resonator of about 15 cm for 1 GHz. It is not easy to form a very short resonator with two electro-optical switches, so it is better to use one electro-optical switch (see a preferable realization below, in FIG. 3 and FIG. 4).

Figure 3:
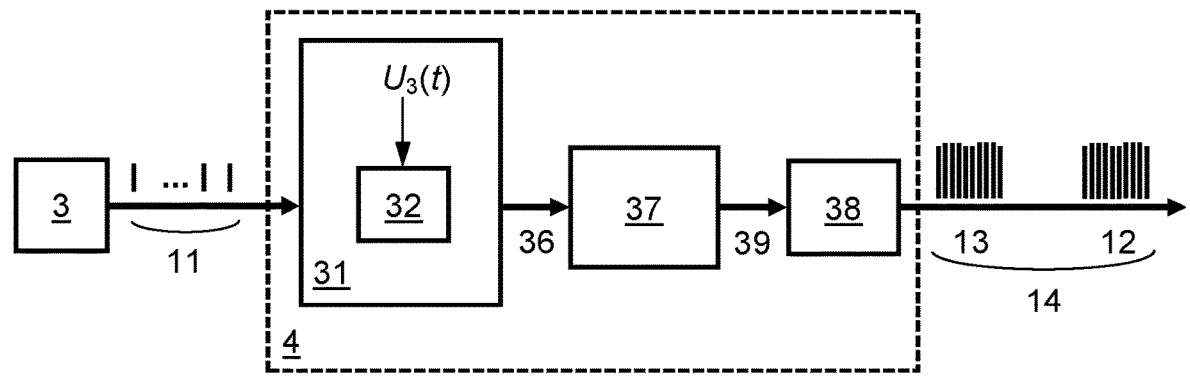
FIG. 3—preferred embodiment of the pulse bursts formation and amplification module.

FIG. 3 shows a structure of the pulse bursts formation and amplification module 4 in the preferable embodiment of the present invention. The module 4 includes a short-resonator solid-state regenerative amplifier 31, a solid-state linear amplifier 37 and a harmonics generation device 38. The regenerative amplifier 31 contains only one electro-optical switch 32 driven by a multi-level voltage signal $U_3(t)$.

For tuning the laser source of this invention in the VIS-NIR region, the wavelength of the pump radiation must be in the visible region of the spectrum. Therefore, the second, third or fourth harmonic radiation is generated from the fundamental radiation of the amplifiers. It is possible to generate pump radiation in the spectral region between 250 nm and 750 nm. For example, OPO with a BBO nonlinear crystal pumped by 355 nm radiation has an extremely wide continuous tuning range from 395 nm to 2600 nm. The tuning range of BBO pumped at 532 nm is narrower, from 670 nm to 2600 nm, since absorption of the crystal increases from 2600 nm. The BIBO nonlinear crystal has a narrower tuning range than the BBO, but the nonlinear gain is higher, and the spectral line of the parametrically amplified radiation is narrower than that from the BBO. KTA and KTP crystals pumped with 532 nm radiation can cover the range from 610 nm to 4000 nm. Lithium niobate crystals are transparent up to 5000 nm.

The highest repetition rate $f_3$ at which the regenerative amplifier can operate stably and with repeatable characteristics depends on the energy of the seed pulse and the lifetime of the excited state of the active medium. A regenerative amplifier with the Nd:YVO$_4$ active medium, providing a few tens of nJ of pulse energy, operates stably up to 10 kHz pulse repetition rate $f_3$. The Nd:YAG medium has a longer lifetime of the excited state, thus the amplifier would operate stably up to 5 kHz. Up to $f_3$=5 kHz, any of Nd:YAG and Nd:YVO$_4$ or other Nd-ion doped active media can be used in the LD-pumped regenerative amplifier of this invention laser source. In certain cases, the upper limit of the repetition rate of the pulse bursts can be extended to 20 kHz. There is no limit into the low rates side, but repetition rates of at least 500 Hz are preferable for contemporary spectroscopic applications.

When pulse bursts are formed by the regenerative amplifier and then amplified in the linear amplifier, it is important to take into account a saturation of the amplifier. This means that the beginning of the pulse burst envelope must be of a rising shape. Therefore, the rising-envelope bursts 34, 35 (shown in FIG. 2) from the regenerative amplifier 31 are suitable for providing flat-top bursts at the output of the amplifier 37 (sequence 39). High peak power pulses from the amplifier 37 are then efficiently converted to harmonic radiation in the device 38. Amplitudes of the pulses in the bursts 12, 13 differ by no more than 20% after the generation of harmonics. The total amplification factor of the regenerative amplifier 31 and the linear amplifier 37 must be at least $10^4$, as well as the efficiency of the harmonic generator 38 must be at least 25% to meet the requirement that the peak power of 5 to 15 pump pulses is 800 kW or higher and sum energy of the pump pulse bursts 12, 13 attains hundreds of microjoules. The moment of turning on a partial transmission of the resonator of the regenerative amplifier 31 is when the energy of the pulse circulating inside the resonator achieves 1 μJ.

In a particular embodiment, Nd:YVO$_4$ active media were used in both the regenerative and linear amplifiers 31, 37, and BBO and LBO second and third harmonic crystals were used in the harmonics generation device 38. When the regenerative amplifier operated at $f_3$=10 kHz, 330 μJ sum energy of bursts at 355 nm was obtained. A regenerative amplifier of 15 cm optical length generated 10 ns-duration (full width at half amplitude level) bursts filled with picosecond pulses of repetition rate $f_2=1$ GHz. A bandwidth of the pump pulses 15-17 and 18-20 did not exceed 1.4 cm$^{-1}$, and a duration was 40 ps.

Figure 4:
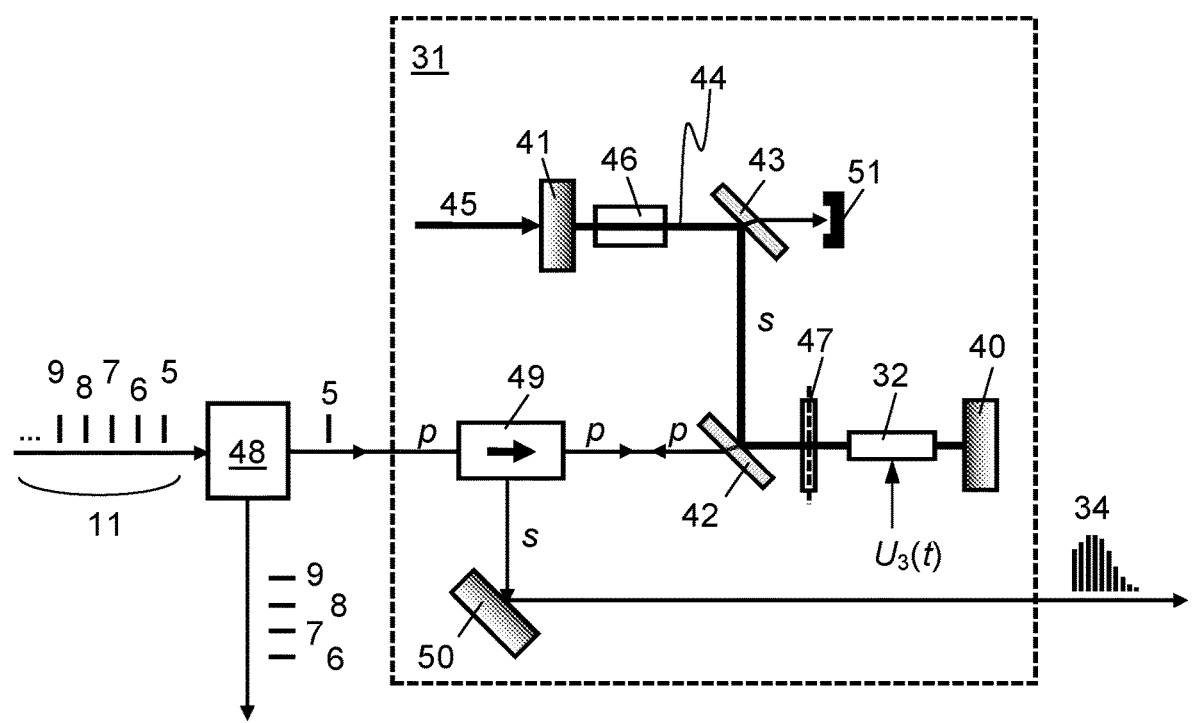
FIG. 4—optical scheme of the regenerative amplifier of the pulse bursts formation and amplification module according to FIG. 3.

FIG. 4 shows an optical layout of one of the possible embodiments of a compact regenerative amplifier suitable for fulfilling the pulse bursts formation and amplification module 4 according to FIG. 3. Mirrors 40, 41 and polarizers 42, 43 form a resonator 44 of the regenerative amplifier 31 with an optical length $L_1$. The mirror 40 is high-reflective for the amplified radiation, the mirror 41 is dichroic—transmissive for the pump radiation 45 and high-reflective for the amplified radiation. The resonator 44 contains an active element 46, a Pockels cell 32, and a quarter-wave plate 47. With no voltage applied to the Pockels cell 32, a double pass through the quarter-wave plate 47 changes radiation polarization to orthogonal.

A pulse picker 48 reduces the pulse repetition rate of the seed pulse train 11—selects only those pulses which are intended to be amplified. It transmits pulses from the train 11 which repeat at a rate $f_3$ and reflects other pulses to the side. The picked pulse 5 (selected for the amplification) passes an optical isolator 49 consisting of a Faraday rotator, a half-wave plate and a polarizer or a pair of polarizers. The isolator 49 protects the source of seed pulses from back-returning reflected radiation or spontaneous emission of the amplifier active element.

Seed pulse of p polarization enters the resonator 44 of the regenerative amplifier 31 through the polarizer 42. As long as no voltage is applied to the Pockels cell 32, polarization of radiation—which passes the quarter-wave plate 47, is reflected by the mirror 40 and passes the quarter-wave plate 47 for the second time—is rotated by 90 degrees. The pulse of s polarization is now reflected by the polarizer 42. After reflection from the second polarizer 43, passes the active element 46, is reflected by the dichroic mirror 41 and then returns through the elements 46, 43, 42, and the second roundtrip begins.

Trapping of the seed pulse in the regenerative amplifier occurs by applying a quarter-wave voltage $U_{\lambda/4}$ between electrodes of the Pockels cell 32. If a quarter-wave phase delay is established ($U_{\lambda/4}$ voltage grows up) before the pulse passes through the Pockels cell 32 for the second time, the quarter-wave plate 47 and the Pockels cell 32 act together as a half-wave plate. Pulses making a double pass would not experience any polarization change, thus after reflection from the polarizer 42 would stay the resonator. The moment of tuning on the voltage on the Pockels cell is chosen in such a way that to ensure the most stable operation of the amplifier, even if only a part of the seed pulse is injected into the resonator. This is achieved by precisely synchronizing the arrival of the seed pulse to the resonator and the moment of turning on of the high voltage on the Pockels cell. In the regenerative amplifier of this invention, the accuracy of the voltage switching moment ensures energy stability of the output pulses by at least 1%. When the resonator 44 of the regenerative amplifier is completely closed, the trapped pulse experiences high amplification and low losses.

After the pulse is amplified up to a desired level, part of its energy is outcoupled from the resonator 44 in the following way: a double pass through the quarter-wave plate 47 and the Pockels cell 32 to which a lower than $U_{\lambda/4}$ voltage is applied changes polarization of radiation. It is partially transmitted by the polarizer 42. The optical isolator 49 directs it to a direction other than the initial direction of the seed pulse. A mirror 50 further directs it to the output port of the amplifier 31. If the voltage were turned off completely, the phase of partial transmittance of the resonator would last only as long as a trailing edge of the voltage signal lasts. If the voltage is only reduced (to an intermediate level between $U_{\lambda/4}$ and 0V), then the phase of partial transmittance of the resonator lasts longer. During the partial transmittance phase, the pulse circulating inside the resonator 44 makes many roundtrips, and a part of its energy is outcoupled from the resonator on each roundtrip. This forms a burst 34 of pulses of a desired duration and energy, and consisting of 5 to 15 pulses (counting at half-maximum-amplitude level of the burst). When the voltage on the Pockels cell drops to 0V, all energy of the pulse is ejected from the resonator. It is best to completely open the resonator when the required duration and energy burst is formed. Pumping and accumulation of inversion in the active element 46 for the new amplification cycle can be started immediately after emptying the resonator. Other nuances relating the regenerative amplifier configuration:

- The Pockel cell 32 is placed in the resonator as close as possible to the beam waist. This ensures good polarization contrast.
- A resonator branch between the polarizer 42 and the mirror 40, which contains a quarter-wave plate 47 and the Pockels cell 32, is as short as possible.
- A beam dump 51 absorbs the unabsorbed pump radiation which passes through the polarizer 43.
- Due to a finite contrast (typically, 1:1000) of polarizers, at least 0.1% of s polarization radiation also passes through the polarizer 43. It can be used to monitor the evolution of the resonator pulse and to calculate the internal resonator energy.
- In another embodiment of the regenerative amplifier, there is a spectral narrowing element inside the resonator 44, such as an etalon, with which pulses of smaller bandwidth and correspondingly longer duration can be formed.

Figure 5:
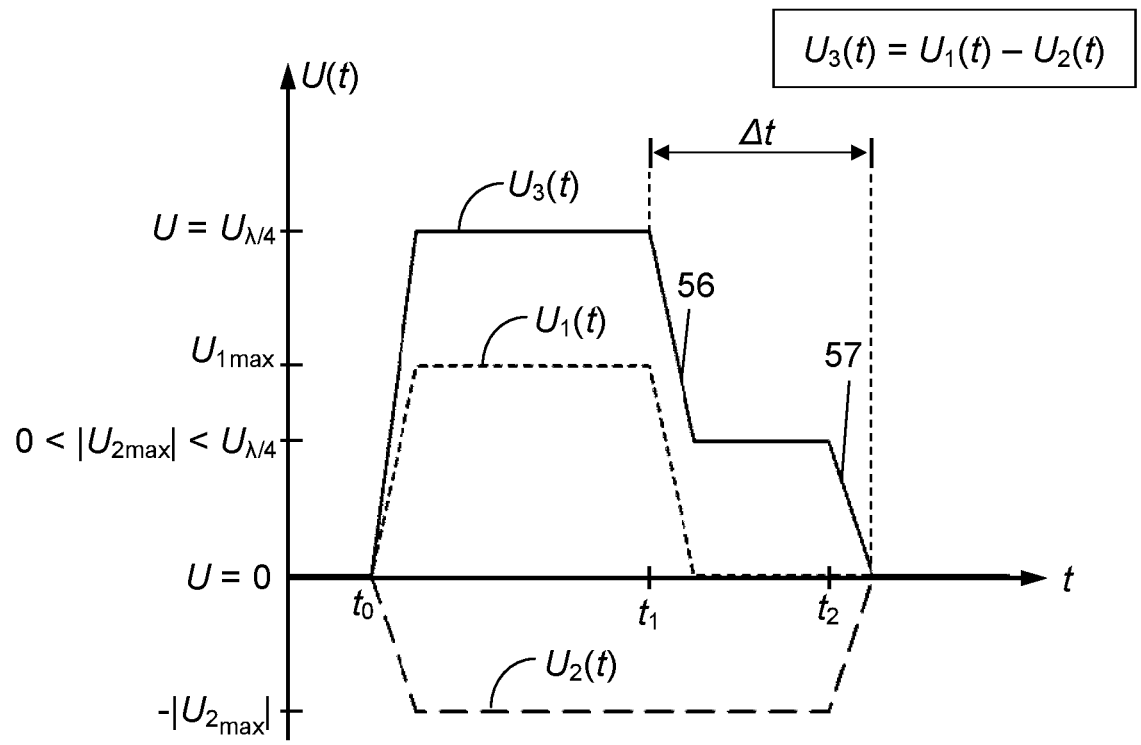
FIG. 5—illustration of the two-level voltage signal $U_3(t)$ and a schematic of connecting the drivers to the electro-optical switch.
Figure 5:
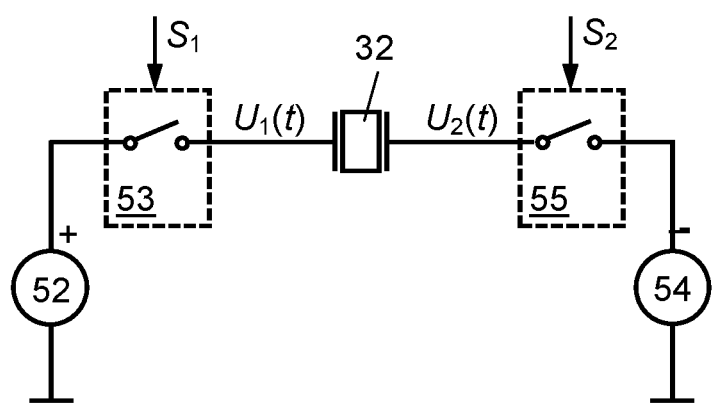

FIG. 5 shows a two-level voltage signal $U_3(t)$ in time and a schematic of connecting of high voltage drivers to the electro-optical switch (Pockels cell 32). In order to realize the regenerative amplifier operation mode described before, in which the burst of ultrashort pulses consisting of a desired number of identical pulses and of desired energy is formed, a complex high-voltage signal must be applied to the Pockels cell 32. The two-level signal $U_3(t)$ is formed from voltage pulses $U_1(t)$ and $U_2(t)$ of different durations. The first high-voltage source 52 supplies a positive potential, and a key 53, which is controlled by a synchronization pulse $S_1$, generates a voltage pulse $U_1(t)$ applied to the first electrode of the Pockels cell. The second high-voltage source 54 supplies a negative potential, and a key 55, which is controlled by a synchronization pulse $S_2$, generates a pulse $U_2(t)$, applied to the second electrode of the Pockels cell. Thus, the potential difference on the electrodes of the Pockels cell is equal to $U_3(t)=U_1(t)-U_2(t)=U_1(t)+|U_2(t)|$.

At time $t_0$, both keys 53, 55 begin to open. At time $t_1$, the first key 53 begins to close. After the time required for the key 53 to close completely (the front 56 is equal to several nanoseconds), the Pockels cell 32 is subjected to a voltage $U_3=|U_{2max}|$, which is less than a quarter-wave voltage $U_{\lambda/4}$. At time $t_2$, the second key 55 begins to close. During the time required for the key 55 to close completely (the front 57 is equal to several nanoseconds), the Pockels cell 32 is still exposed to the potential difference, so the resonator is still partially transmissive. The moments $t_1$ and $t_2$ of switching the high voltage off are selected so that the total time when the resonator has partial transmittance is about 10 ns.

FIGS. 6A-6D are modelling results of how the shape and energy of the pulse burst 34 at the output of the regenerative amplifier 31 is controlled by varying the moments of switching on and switching off the resonator partial transmittance and by changing the potential difference on the electrodes of the Pockels cell. A time scale corresponds to a number of roundtrips N. The resonator dumping level is shown as the coefficient R(N) of reflection back to the resonator. $U_3'(N)$, $U_3''(N)$, $U_3^*(N)$, $U_3^{**}(N)$ are Pockels cell driving voltage functions, where time is expressed as the number of resonator roundtrips N. R'(N), R''(N), R*(N), R**(N)—resonator reflectance functions; R relates to the resonator transmittance T and the voltage of the Pockels cell by this relationship:

$$R = 1 - T = \sin^2(\pi/2 * U/U_{\lambda/2}).$$

The figures illustrate how pulse energy inside and outside the resonator changes depending on the number of roundtrips N of the resonator: 58', 58'', 58*, 58**—energy of the pulse circulating inside the resonator, and 59', 59'', 59*, 59**—energy of the pulse that is ejected. By varying the resonator partial transmission level, beginning time and duration, it is possible to control a duration, shape (rising, constant, or falling amplitude), and sum energy of the output pulse bursts.

With a very low seed pulse energy (10 µJ), several tens of resonator roundtrips are required to amplify the pulse up to a desired energy level. When $U_3 = U_{\lambda/4}$, the resonator quality is high, the pulse is completely trapped (resonator's R=1), and no radiation is emitted. When the resonator starts to open (R<1), part of the energy of the amplified pulse is outcoupled. In this way, the formation of the output pulse burst already begins. The lower the resonator's R, the larger part the pulse energy is outcoupled from the resonator. The shape of the pulse burst and sum energy depend on the resonator partial transmission switching moment $N_{t1}$, the duration Δt (see FIG. 5) and the R value between time moments $N_{t1}$ and $N_{t2}$. As long as one roundtrip gain exceeds the loss, energy of the circulating pulse increases. When the roundtrip gain equals the loss, energy of the pulse stops to increase. When the inversion of the active medium is depleted, the gain no longer outweighs the loss, and the energy of the pulse starts to decrease.

Figure 6A:
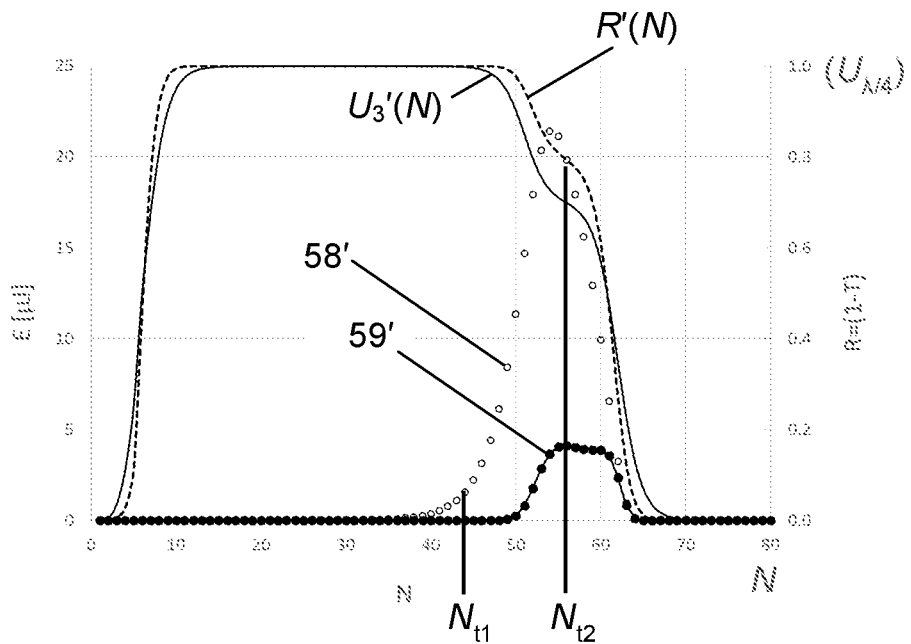
FIG. 6A-6D—modelling results of pulse bursts at the output of the regenerative amplifier.
Figure 6B:
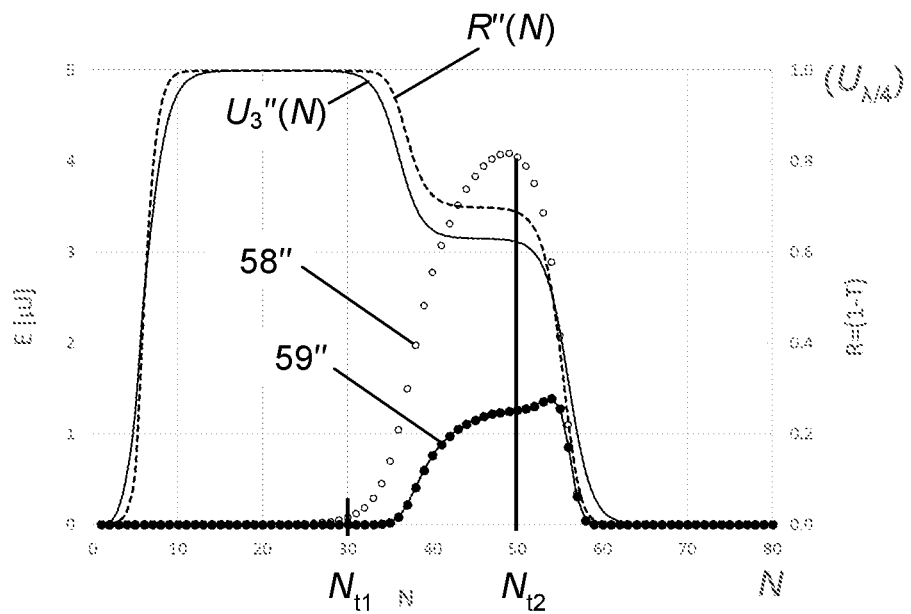
Figure 6C:
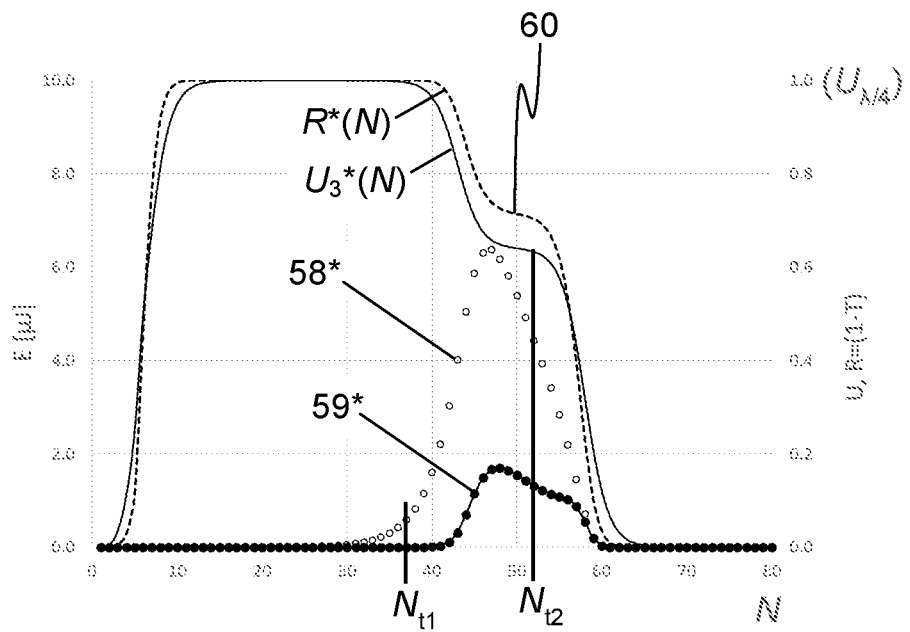
Figure 6D:
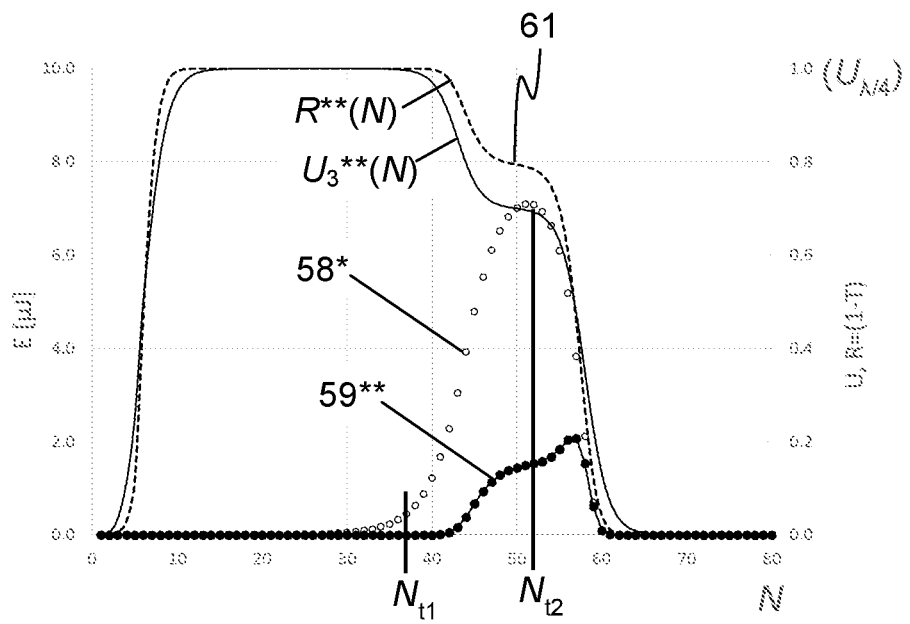

FIG. 6A and FIG. 6B illustrate how the shape of the regenerative amplifier pulse burst depends on the beginning time of the resonator partial transmission. By setting the resonator partial opening time earlier, a longer burst 59'' of pulses with increasing amplitudes can be formed (FIG. 6B). By delaying the opening, a short flat-top pulse burst 59' can be formed (FIG. 6A). FIG. 6C and FIG. 6D illustrate how the shape of the regenerative amplifier pulse burst depends on the partial transmission level 60 and 61 when $N_{t1}$ and $N_{t2}$ are fixed.

Figure 7A:
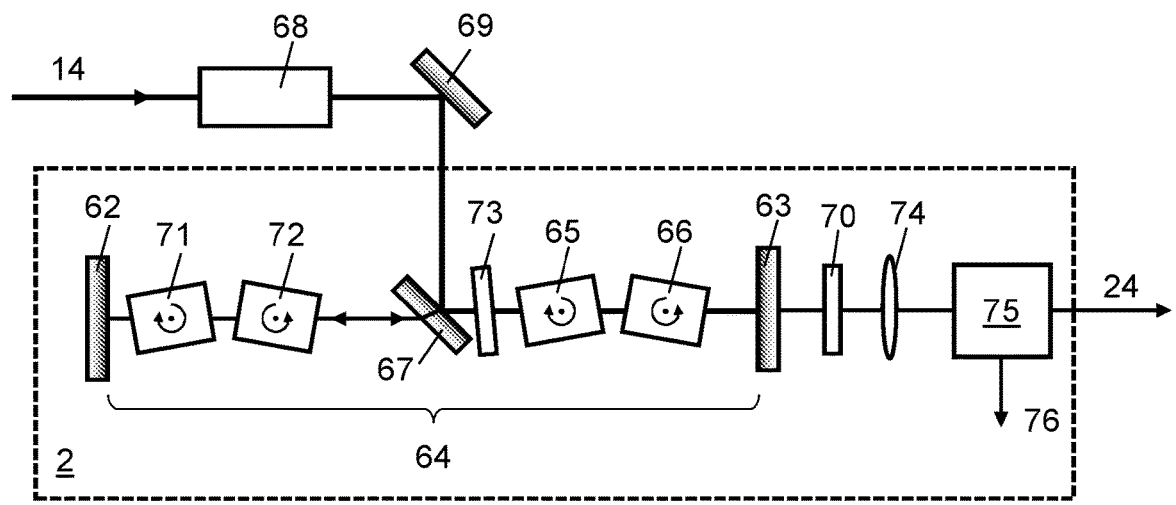
FIG. 7A-7C—various realizations of the synchronously pumped optical parametric oscillator.
Figure 7B:
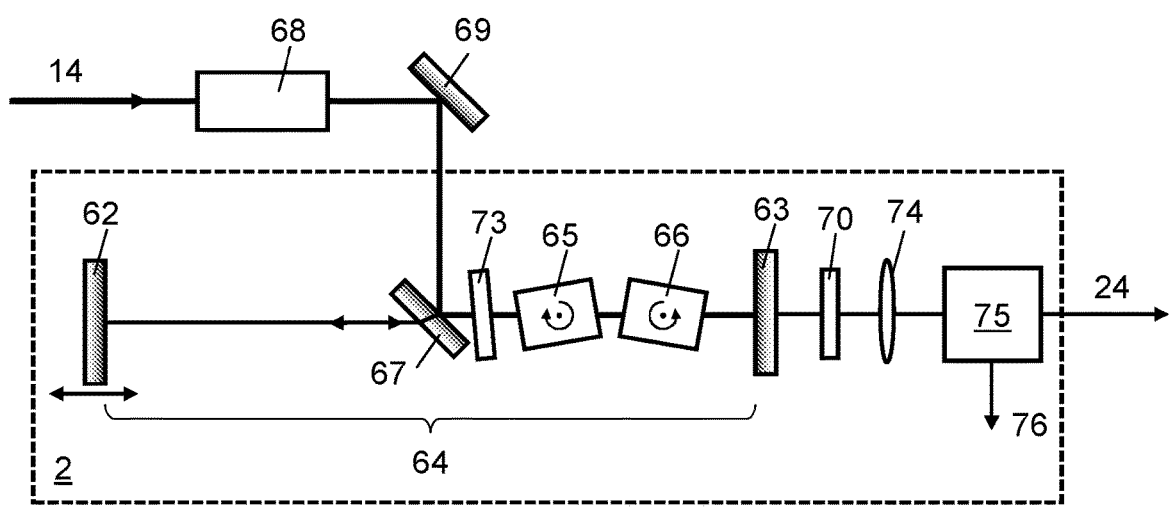
Figure 7C:
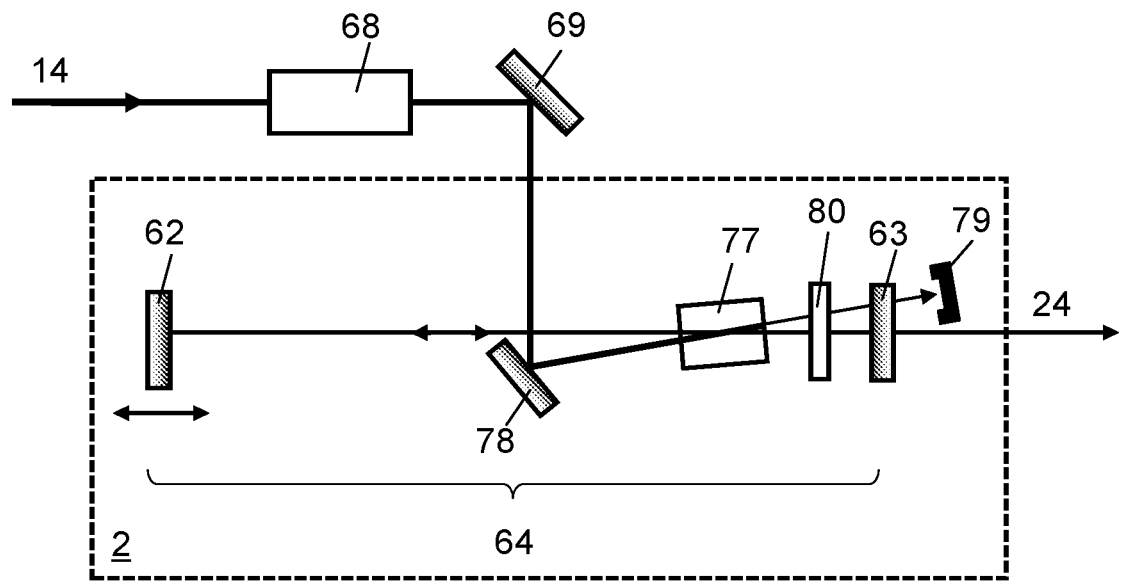

FIGS. 7A-7C depict various possible embodiments of the synchronously pumped OPO 2. Mirrors 62 and 63 form a linear resonator 64 of an optical length $L_2$. The mirrors are flat or concave. The OPO of FIG. 7A and FIG. 7B comprises a pair of collinearly pumped nonlinear crystals 65, 66, a pump radiation input separator 67 and several additional elements placed in the resonator along its optical axis. Separator 67 reflects the pump radiation, e. g. 355 nm, and completely transmits the parametrically generated radiation. A telescope 68 focuses the pump radiation into the nonlinear crystals. A mirror 69 and the separator 67 together direct the pump radiation along the optical axis of the OPO. Element 70 is a spectral filter, if necessary. The wavelength tuning of the OPO is performed by varying an angle between the optical axis of the crystal and the pump radiation direction (and thus the resonator axis). Physically, this is done by rotating the nonlinear crystals 65, 66 (angular tuning). Using the pair of nonlinear crystals, the parallel beam shift is compensated, and, by symmetrically aligning, the aperture effect is compensated. A symmetric beam of parametrically generated radiation is obtained. Temperature tuning is also applicable, but in this case, it is not possible to realize a fast change of wavelengths. In the case of angular tuning, constant temperature of the nonlinear crystals 65, 66 is maintained. Rotation of the nonlinear crystals 65, 66 changes the optical length of the resonator. In synchronous pumping, it is important to match the resonator roundtrip time to the repetition rate $f_2$ of the pump pulses inside the pump pulse bursts. Therefore, the optical length $L_2$ of the resonator 64 must be equal to the optical length $L_1$ of the resonator 44 of the regenerative amplifier. This condition can be satisfied by adjusting both the length of the OPO resonator 64 and the length of the regenerative amplifier resonator 44. In FIG. 7A, the length adjustment of the resonator 64 is implemented by using compensators 71 and 72 (parallel transparent plates), which are rotated. The rotation of the compensators 71 and 72 is synchronized with the rotation of the nonlinear crystals 65, 66. Rotation changes optical thicknesses of the plates and this compensates for changes in the optical thicknesses of nonlinear crystals when the wavelength of the generated radiation is tuned. Holders of the resonator end mirrors 62, 63 are fixed. FIG. 7B is a variant of the length adjustment of the resonator 64 realized by moving one of the end mirrors: a holder of the mirror 62 is mounted on a positioning table, the change of position of which is synchronized with the rotation of the nonlinear crystals 65, 66.

Inside the OPO resonator 64, there may also be elements for spectral narrowing, e. g. an etalon 73 or a diffraction grating instead of the mirror 62. In the collinear interaction, phase-matching is ensured for a relatively narrow spectral range of the signal and idler waves, thus the spectral narrowing element can be omitted. The bandwidth of the parametrically generated radiation is typically larger than the bandwidth of the pump radiation. The bandwidth of the output radiation also depends on the signal and idler wavelengths $\lambda_S$ and $\lambda_I$. For example, if the bandwidth of the pump radiation at 355 nm is less than 1.4 cm$^{-1}$, the bandwidth of the parametric radiation 24 generated in the BBO crystals will not exceed 10 cm$^{-1}$ over the entire tuning range in a flat-mirror resonator 62, 63; and will not exceed 8 cm$^{-1}$ if using the diffraction grating. With several spectral narrowing means, it is possible to ensure the bandwidth of the output radiation 24 not exceeding 3 cm$^{-1}$.

According to a preferable embodiment of the OPO of this invention, the resonance condition is satisfied for the signal wave: the length of the resonator 64 is equal to an integer number of signal wavelengths $\lambda_S$, and the mirror 63 is highly-transmissive for the idler wave and partially transmissive for the signal wave. An optimal reflection coefficient of the mirror 63 for the signal wavelengths in the (395-709) nm range is 50%. The reflection coefficient up to 75% may also be used for the mirror 63, which will return a larger portion of the signal wave energy to the resonator, thereby accelerating the build up of parametric radiation in the resonator 64. Since the resonator 64 is short, the beam spot of radiation is small and the beam diverges rapidly. Thus, a collimating lens 74 is present near the output of the OPO (in front of or behind the filter 70).

Pumping the BBO-based optical parametric oscillator with the 355 nm wavelength gives the tuning range from 395 nm to 2600 nm, wherein signal wave radiation covers the 395 nm to 709 nm range and idler wave radiation covers 710 nm to 2600 nm range. In a type two (II) parametric interaction, polarization of the idler wave differs from polarization of the signal wave, therefore the separation is performed by polarization selective elements. The polarization selective element 75 shown in FIG. 7A, FIG. 7B preferably is a Rochon prism. Depending on the orientation of the Rochon prism 75, either signal or idler wave radiation is transmitted to the output port. The other portion of the radiation 76 is directed to a beam dump, or to an additional output port.

FIG. 7C shows an embodiment of non-collinear phase-matching OPO 2. In non-collinear parametric amplification, the signal or idler wave propagate along a cutting axis of the nonlinear crystal. Non-collinear interactions can be realized using a single nonlinear crystal 77 without rotating it, and the resonator can be extremely compact. With the help of mirrors 69, 78, the pump radiation is directed at an angle to the nonlinear crystal 77 (the unabsorbed part, after one pass, is absorbed in the beam dump 79). In such interaction geometry, the gain bandwidth is extremely wide, so spectral filters and/or etalons 80 are necessary for the wavelength tuning and narrowing of the spectrum.

Ring resonator OPO configurations consisting of three or four mirrors can also be made. However, they become impractical for constructing OPO of a short resonator.

Figure 8:
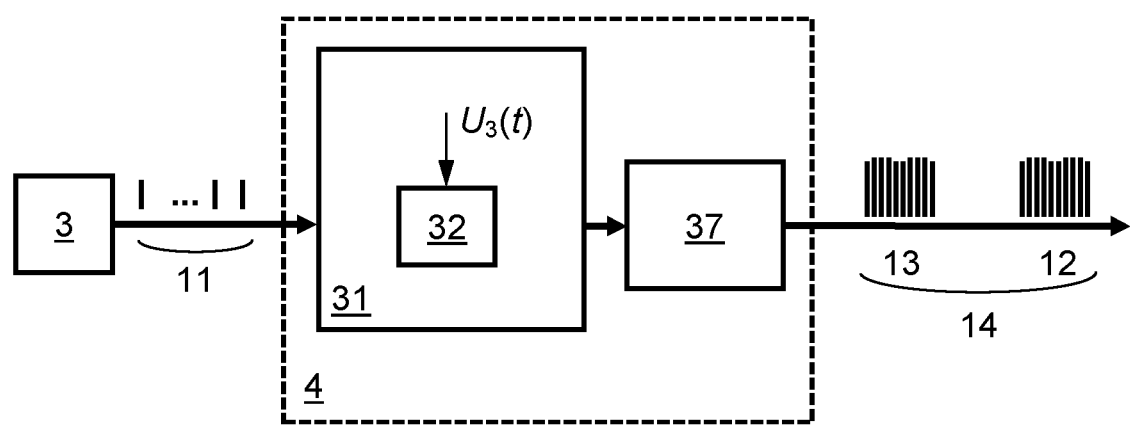
FIG. 8—another embodiment of the pulse bursts formation and amplification module.

FIG. 8 shows another embodiment of the present invention. The pulse bursts formation and amplification module consists of the regenerative amplifier 31 and the linear power amplifier 37, but there the harmonics generation device is absent. In this case, pump radiation 14 is the fundamental radiation of the active medium of amplifiers.

For some applications, the wavelength-tunable radiation with a variable repetition rate of bursts may be needed. Therefore, the pump laser may provide picosecond-pulse bursts at a variable repetition rate, and pulse bursts of wavelength-tunable radiation are generated only when the pump pulse bursts arrive to the optical parametric oscillator. The variable burst repetition rate of the pump laser can be accomplished in several ways. First, the laser oscillator for seeding the pump laser is selected from oscillators that have an ability to emit pulses on demand. Second, there is an additional optical switch at the output of the pump laser, which selects only required bursts from the generated sequence of bursts. Third, amplitude of oscillator pulses is modulated so that their gain and evolution in the bursts formation and amplification module is different. Due to the reduced peak power of the pump pulses, the parametric generation will only occur from the high-energy pump pulse bursts.

The OPO of the present invention pumped with ns-long bursts of picosecond pulses results in high efficiency: the exact temporal coincidence of the pump pulse and the generated parametric pulse on every roundtrip leads to conversion efficiency of at least 10%. Namely, the regular temporal structure of the pump pulse bursts, as compared to the noisy structure of the multimode nanosecond pulse, is the main reason of high nonlinear conversion efficiency. The duration of the peaks present in the nanosecond pulse is of the same order as the duration of the picosecond pump pulses of this invention. However, nanosecond OPOs, with the same pump pulse energy, are several times less efficient than the OPO of the present invention. However, spectral properties are comparable or identical: the bandwidth of the wavelength-tunable radiation generated in the OPO, which is pumped with several-ns-long burst of picosecond pulses, is identical to that of the ns-pulse pumped OPO. The duration of the generated parametric output pulse burst is identical to the pulse duration obtained by the ns-pulse pumped OPO. This means that the source of this invention is perfectly suitable for both spectral studies and time-resolved studies, while has better energy conversion efficiency. Potentially, this may also mean a lower prime cost of producing the source of this invention compared to a nanosecond tunable laser system with the same parameters of tunable radiation. It is evident that the wavelength-tunable laser source produced according to this invention has many advantages. Using all well-known nonlinear crystals and pumping with the most suitable wavelengths, the proposed wavelength-tunable laser source has a capability to cover a very wide spectral range from UV to NIR, from ~400 nm to ~5000 nm. If sum or difference frequency generation with the residual pump radiation is additionally realized, the tuning range extends to the UV range down to 190 nm and to the mid-IR range up to 16 μm. Periodically poled nonlinear crystals can also be used; temperature tuning is then preferable.

The described wavelength-tunable source of pulsed laser radiation of the present invention is compact, easily serviceable and reliable. Due to the short resonator, which corresponds to a pulse repetition rate from 200 MHz to 2 GHz, all the configurations of the optical parametric oscillator described above are very compact and therefore weakly respond to external factors. Requirements for the resonator length stabilization feedback system, which adjusts the optical lengths of the regenerative amplifier and the OPO resonators, are easy to implement. The synchronous pumping in a time interval of several nanoseconds allows to achieve a greater than 10% efficiency of parametric light generation in bulk nonlinear crystals in the entire tuning range. The energy of individual parametrically generated pulses is of the order of microjoules. The tuning range from 200 nm to 5000 nm can be covered by selecting a proper pumping wavelength and nonlinear crystal material. After additional sum or difference frequency generation, the tuning range covers from 200 nm to 16 μm. The radiation of ns-long picosecond pulse bursts with a spectral width not exceeding 3 cm$^{-1}$ and high burst repetition rate is highly suitable for spectroscopic applications.

The invention claimed is:

1. A wavelength-tunable source of pulsed laser radiation for VIS-NIR spectroscopy comprising:
   a pump pulse source comprising:
      a laser oscillator generating a continuous train of picosecond seed pulses, defined by a first repetition rate $f_1$ in a range from 10 kHz to 100 MHz;
      a module for pulse bursts formation and amplification which provides a sequence of bursts of pump pulses, being a pump radiation,
      wherein each said burst of pump pulses consists of picosecond pump pulses, repeating at a second repetition rate $f_2$ which is higher than said first repetition rate $f_1$ and is in a range from 200 MHz to 2 GHz; a time interval between adjacent bursts of pump pulses corresponds to a third repetition rate $f_3$ which is lower than the second repetition rate $f_2$ and lower than or equal to the first repetition rate $f_1$ and is in a range from 500 Hz to 10 kHz, a duration of the adjacent bursts of pump pulses being equal to a time interval $\Delta t$ and each burst of pump pulses contains from 7 to 15 consecutive pump pulses with a peak power exceeding 800 kW, while a sum energy of each burst of pump pulses is not less than 300 µJ, said module comprising:

a solid-state regenerative amplifier having one or two optical switches inside a solid-state regenerative amplifier resonator;

wherein said one or two optical switches are configured so that, by applying a voltage to one or both of said one or two optical switches, seed pulses-spaced apart by a time interval of 1 over the third repetition rate $1/f_3$, are trapped inside the solid-state regenerative amplifier resonator;

wherein an accuracy of a moment $t_0$ to when the voltage is turned on ensures at least 1% energy stability of pulses output from the module for pulse bursts formation and amplification;

wherein turning off the voltage on one of said one or two optical switches or reducing the voltage on one or both of said one or two optical switches at a time moment $t_1$, a partial transmittance of the solid-state regenerative amplifier resonator is created for the time interval $\Delta t$ which is longer than a roundtrip time of said solid-state regenerative amplifier resonator, and a part of energy of a pulse circulating inside said solid-state regenerative amplifier resonator is coupled out;

wherein a bandwidth of said pump pulses, does not exceed 1 cm$^{-1}$, while a duration is from 15 ps to 70 ps; and an optical parametric oscillator comprising:

at least two mirrors forming an optical resonator of a length $L_2$;

at least one optical parametric amplification nonlinear crystal, placed inside said optical resonator of the length $L_2$, wherein two photons of lower energy are generated from one photon of radiation of pump wavelength $\lambda_P$: a signal wave photon of wavelength $\lambda_S$ As and an idler wave photon of wavelength $\lambda_I$;

the pump pulse source and the optical parametric oscillator being mutually matched so that a roundtrip time of the optical resonator constituting the optical parametric oscillator is made equal to a time interval $1/f_2$ between adjacent pump pulses;

the optical parametric oscillator providing a sequence of bursts of output pulses, said sequence of bursts of output pulses being an output radiation of the wavelength-tunable source, wherein each said burst of output pulses consists of picosecond pulses, of a signal and/or an idler wave, wherein for the pump wavelength $\lambda_P$, a phase-matching condition for optical parametric amplification in said optical parametric amplification nonlinear crystal is satisfied over an entire transparency range of the optical parametric amplification nonlinear crystal;

wherein a conversion efficiency from the sequence of bursts of pump pulses to the sequence of bursts of output pulses is at least 10% in an entire wavelength tuning range;

wherein each burst of output pulses has from 5 to 10 consecutive output pulses with a peak power exceeding 10 kW in the entire wavelength tuning range;

wherein a bandwidth of the output pulses of the output radiation does not exceed 10 cm$^{-1}$;

wherein, when pumped with near-infrared laser radiation or its harmonics, the wavelength tuning range of the output radiation covers visible and near-infrared spectral regions.

2. The wavelength-tunable source according to claim 1, wherein the solid-state regenerative amplifier has one electro-optical switch controlled by a two-level voltage signal $U_3(t)$.

3. The wavelength-tunable source according to claim 1, wherein a time moment $t_1$, when a partial transmittance of the solid-state regenerative amplifier resonator is created, is when energy of the pulse circulating inside the solid-state regenerative amplifier resonator reaches the level of 1 µJ.

4. The wavelength-tunable source according to claim 1, wherein the module for pulse bursts formation and amplification further comprises a solid-state linear amplifier; and an overall gain of the solid-state regenerative amplifier and the solid-state linear amplifier is not less than 10$^4$.

5. The wavelength-tunable source according to claim 4, wherein the laser oscillator is a solid-state Nd:YVO$_4$ or Nd:YAG mode-locked oscillator generating up to 10 nJ energy picosecond pulses at the first repetition rate $f_1$ equal to 80 MHz;

the solid-state regenerative amplifier is a regenerative amplifier of Nd:YVO$_4$ or Nd:YAG medium, which forms pulse bursts with energy exceeding 20 µJ, when the third repetition rate $f_3$ of the bursts is equal to 10 kHz;

the solid-state linear amplifier is a single-pass or a double-pass amplifier of Nd:YVO$_4$ or Nd:YAG medium, at an output of which energy of pulse bursts exceeds 1 mJ at the third repetition rate $f_3$ equal to 10 KHz.

6. The wavelength-tunable source according to claim 1, wherein the signal wave photon of wavelength and $\lambda_S$ and the idler wave photon of wavelength $\lambda_I$ generated during the parametric interaction is changed by: 1) rotating said at least one optical parametric amplification nonlinear crystal with respect to its optical axis, 2) changing a temperature of the at least one optical parametric amplification nonlinear crystal, or 3) changing a transmission or reflection wavelength of a spectrally selective element.

7. The wavelength-tunable source according to claim 6, wherein the pump radiation beam propagates collinearly to an axis of the optical resonator of the optical parametric oscillator;

said at least one optical parametric amplification nonlinear crystal is a pair of crystals selected from BBO, BIBO, LBO, KTA, KTP, MgO:LiNbO$_3$, or ZnO:LiNbO$_3$; and wavelength tuning is performed by symmetrically rotating both crystals of said pair of crystals in opposite directions with respect to the optical axes of the crystals and/or by changing the temperature of the crystals.

8. The wavelength-tunable source according to claim 6, wherein during rotation of the at least one optical parametric nonlinear crystal relative to its optical axis or its temperature change for wavelength tuning, the length $L_2$ of the optical parametric oscillator resonator is adjusted, and the length adjustment is performed according to a highest value of an average power of the output radiation.

9. The wavelength-tunable source according to claim 1, wherein the radiation of pump wavelength is in the range from 250 nm to 1340 nm.

10. The wavelength-tunable source according to claim 1, wherein the wavelength tuning range of the output radiation is from 395 nm to 2600 nm.

11. The wavelength-tunable source according to claim 1, wherein the wavelength tuning range of the output radiation is from 1350 nm to 5000 nm.

12. The wavelength-tunable source according to claim 1, wherein the bandwidth of the output radiation does not exceed 3 cm$^{-1}$.

13. The wavelength-tunable source according to claim 1, wherein a full width at half maximum amplitude level of the adjacent bursts of pump pulses is in the 5-10 ns range, and the amplitude of the adjacent pump pulses with a peak power exceeding 800 kW differs by no more than 20%.

14. The wavelength-tunable source according to claim 1, wherein one mirror of said at least two mirrors forming the optical resonator of the optical parametric oscillator is partially transmissive for the signal wave of wavelength $\lambda_S$ and highly transmissive for the idler wave of wavelength $\lambda_I$.

15. The wavelength-tunable source according to claim 1, wherein said making of the roundtrip time of the optical resonator of the optical parametric oscillator with equal to the time interval $1/f_2$ between adjacent pump pulses is performed by adjusting the length $L_2$ of the optical resonator or a length $L_1$ of the solid-state regenerative amplifier resonator.

16. The wavelength-tunable source according to claim 1, wherein the pump radiation beam propagates collinearly to an axis of the optical resonator of the optical parametric oscillator; said at least one optical parametric amplification nonlinear crystal is a pair of crystals selected from BBO, BIBO, LBO, KTA, KTP, MgO:LiNbO$_3$, or ZnO:LiNbO$_3$; and wavelength tuning is performed by symmetrically rotating both crystals of said pair of crystals in opposite directions with respect to the optical axes of the crystals and/or by changing the temperature of the crystals.

17. The wavelength-tunable source according to claim 1, wherein during rotation of the at least one optical parametric nonlinear crystal relative to its optical axis or its temperature change for wavelength tuning, the length $L_2$ of the optical resonator of the optical parametric oscillator is adjusted, and the length adjustment is performed according to a highest value of an average power of the output radiation.

* * * * *